July 13, 1971    R. R. GOINS ET AL    3,592,885
CORRUGATED PARISON REAL LINE
Filed Dec. 13, 1968    2 Sheets-Sheet 1

INVENTORS
R. R. GOINS
D. E. GILBERT
BY Young + Quigg
ATTORNEYS

July 13, 1971   R. R. GOINS ET AL   3,592,885
CORRUGATED PARISON REAL LINE
Filed Dec. 13, 1968   2 Sheets-Sheet 2

INVENTORS
R. R. GOINS
D. E. GILBERT
BY Young & Quigg
ATTORNEYS

United States Patent Office 3,592,885
Patented July 13, 1971

3,592,885
CORRUGATED PARISON REAL LINE
Robert R. Goins and Dixie E. Gilbert, Bartlesville, Okla., assignors to Phillips Petroleum Company
Filed Dec. 13, 1968, Ser. No. 783,605
Int. Cl. B29c 17/07
U.S. Cl. 264—98    6 Claims

ABSTRACT OF THE DISCLOSURE

The bottom of an open end parison is sealed along a corrugated line.

BACKGROUND OF THE INVENTION

This invention relates to a process for sealing the open end of a parison.

While the blow molding art goes back over 100 years, it has only been in the last dozen years that the blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since the orientation occurs at a temperature below the crystalline melt point while the polymer is on a heating cycle, it was early recognized that little orientation could be effected in a conventional blow molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure in the interior of the parison, thus stretching it circumferentially to impart orientation in a second direction. Such a procedure achieves a product of exceptional strength, and surprisingly, in the case of materials such as polypropylene, greatly improved optical properties.

From an economic standpoint, the most desirable method of forming the parisons is to extrude a continuous length of tubing which is thereafter cut into sections of a measured length, as opposed to injection molding closed end parisons. However, this preferred method of operation necessitates the closing and sealing of one end of the parison in order to form a container or the like. Since the parison must be stretched at a temperature just below its crystalline melting point while on a heating cycle (that is, while still in a substantially solid state), it is apparent that it is not at the proper temperature for being sealed.

SUMMARY OF THE INVENTION

It is an object of this invention to provide for the sealing of a thermoplastic parison. It is a further object of this invention to provide a seal in a parison which is at orientation temperature. It is a further object of this invention to make possible the economical production of closed end thermoplastic articles having enhanced strength and clarity imparted by orientation.

In accordance with this invention, an open end parison is sealed along a corrugated line.

BRIEF DESCRIPTION OF THE DRAWINGS

In the drawings, forming a part hereof, wherein like reference characters depict like parts in the various views.

DESCRIPTION OF THE PREFERRED EMBODIMENTS

Figure 1:
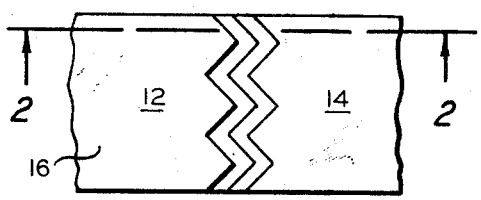
FIG. 1 is a plan view of pinching and sealing jaws in accordance with the invention.

While the instant invention is useful in sealing and severing any tubular material, including molten parisons which are extruded directly between mold halves, pinched shut, and blown out into conformity with the mold while in a heat softened condition, it is of particular utility in sealing and severing parison preforms which have been reheated to a temperature just below the crystalline melting point so as to be susceptible to strengthening orientation on stretching and blowing.

Suitable orientable thermoplastic materials which can be used in the manufacture of these parison preforms include polymers of at least one 1-olefin, said 1-olefin having 2 to 8 carbon atoms per molecule, poly(vinyl chloride) and the like. It is especially useful in the sealing of thermoplastic parisons made from polymers of 1-olefins selected from the group consisting of ethylene, propylene, butene, and mixtures thereof, more particularly, polypropylene.

These polymers can be formed into hollow parison preforms and cooled to a temperature below the crystalline freezing point. These hollow parison preforms in the solid state are then heated to a temperature of about 1 to about 50°, preferably about 2 to about 20°, below their crystalline melting point by any suitable means, and thereafter transferred to a molding station. At this point, the critical sealing of one end of the parison occurs and the parisons are generally stretched longitudinally to impart longitudinal orientation. They are then caused to expand to conform to the shape of a mold by the application of a differential pressure between the interior of the parison and the mold wall, thus imparting circumferential orientation to give a biaxially oriented product.

The crystalline melt point can be determined by heating a small piece of the plastic under a polarizing microscope. The specimen is heated slowly and the temperature at which birefringence disappears is the crystalline melt point. By the term "molding station," as used herein, is meant either a single station where the heated parison is introduced into a mold and expanded by means of differential fluid pressure, or a two or three stage molding station wherein the parison is first stretched longitudinally to impart longitudinal orientation and then is introduced into a mold and caused to conform to the shape of the mold by introduction of fluid pressure into the interior of the parison.

While crystallinity gradually decreases as the polymer is heated, the polymer at optimum orientation temperature still contains a certain amount of crystallinity and has the general physical appearance of solid polymer as opposed to a fluid, easily sealable material. Surprisingly, parisons at this temperature can be closed and a satisfactory seal effected by forming the seal line along a corrugated or zigzag path. Thus, it is possible to operate at the optimum temperature for achieving strengthening orientation and at the same time be able to seal an open end parison, thus circumventing the need for utilizing more expensive injection molded closed end parison preforms.

While an internal means to press against the seal with a flat surface from the inside could be used, it has surprisingly been found that complicated additional mechanisms required when using such a means are not necessary using the instant invention, a good seal being effected simply by pressing together from two sides.

The term "corrugated" seal line is meant to refer to any shape of the interface of the walls of the parison which are sealed together which is of a zigzag or wavy nature, having either smooth or sharp pointed peaks and valleys, being either uniform and symmetrical or nonuniform and unsymmetrical. When the configuration is viewed as being in the nature of a sine wave, it preferably extends through at least one full wave.

While applicant does not want to be bound by theory, it appears that in forming the corrugated seal, the mechanical working of the plastic tends to raise the temperature enough to achieve a better seal than otherwise possible. Also, the corrugated seam provides superior impact resistance, partly because of the better distribution of stresses occurring in that area when the bottle is dropped or struck.

Figure 5:
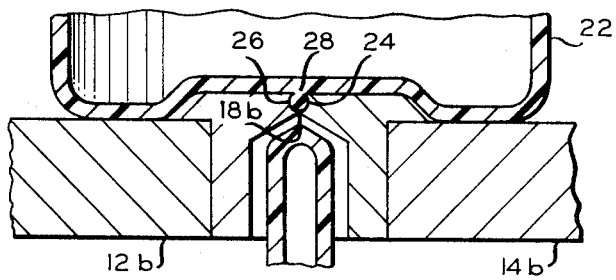
FIG. 5 is a cross-sectional view similar to that of FIG. 2, showing a parison being pinched and severed.
Figure 7:
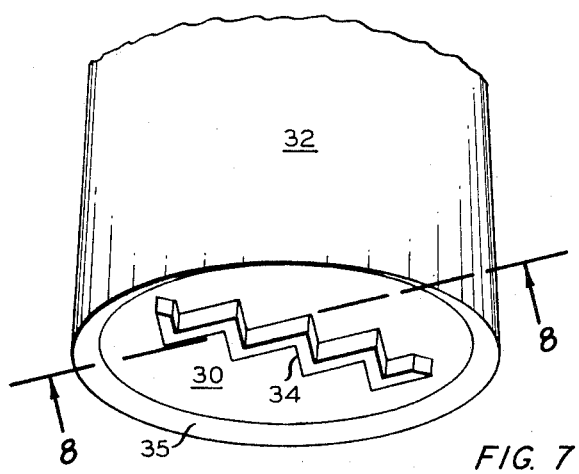
FIG. 7 is a perspective view of the bottom of a bottle sealed with the jaws shown in FIG. 1.
Figure 8:
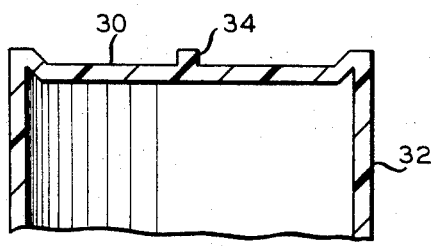
FIG. 8 is a cross-sectional view along lines 8—8 of FIG. 7.
Figure 9:
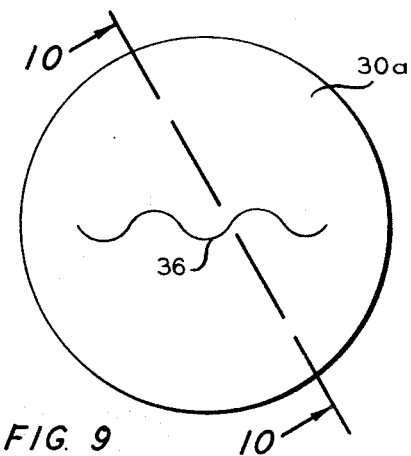
FIG. 9 is a view of the bottom of a bottle, showing the sealing line.
Figure 10:
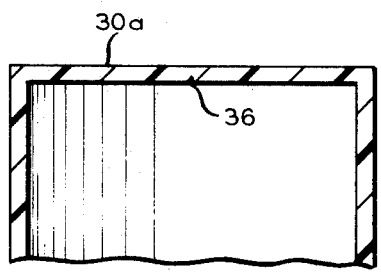
FIG. 10 is a cross-section along section line 10—10 of FIG. 9.

The parison may be pinched off at a point flush with the bottom of the article to be molded, so that the sealing line is nothing more than a line representing the interface of the wall sections as shown in FIGS. 9 and 10. Alternatively, a corrugated strip may project downwardly at right angles to the bottom of the article being formed. FIGS. 7 and 8 show this strip in the form of a tab. FIG. 5 shows this strip in the form of a bead.

Figure 2:
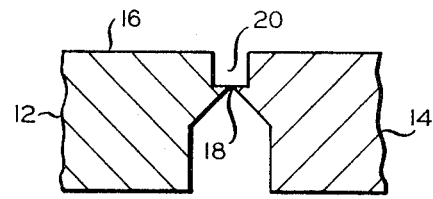
FIG. 2 is a cross section along lines 2—2 of FIG. 1.

Referring now to FIG. 1, there is shown a plan view of a pair of opposed matching pinching and severing members 12 and 14. FIG. 2 shows jaw members 12 and 14 in cross section. Top surfaces 16 of jaw members 12 and and 14 are in horizontal alignment and can form a portion of the bottom of the blown article. (While this mechanism is referred to for the sake of convenience in terms of being disposed so that the parison is in a vertical plane and the bottom end of the parison is sealed by horizontally sliding jaw members, it is understood that in the preferred embodiment where a parison which has been heated to orientation temperature is being sealed, the mechanism can be disposed at an angle or even upside down. Thus the term "top" and the like indicates the relative relationship of the parts as shown in the drawings and is not to preclude disposing the entire apparatus at a different angle.) Pinchoff or severing line 18 is positioned a short distance below top surfaces 16 and the facing surfaces of these jaws above the pinch line are set back to provide a recess 20 for forming a sealing strip at the bottom of the blown article. The plastic in the seal area can be worked and in addition compressed slightly since the width of recess 20 is slightly less than the thickness of both walls.

Figure 3:
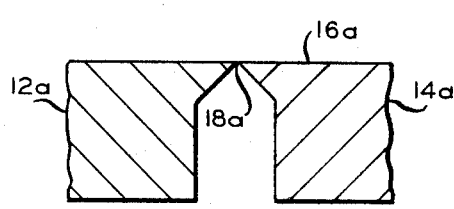
FIG. 3 is a cross-sectional view of pinching and sealing jaws showing a different configuration than that of FIG. 2.

FIG. 3 shows a sectional view of two pinching and sealing jaws 12a and 14a. The severing line 18a is flush with the top surfaces 16a of the pinching jaws so that the parison will be severed along a line flush with the bottom of the article being molded.

Figure 4:
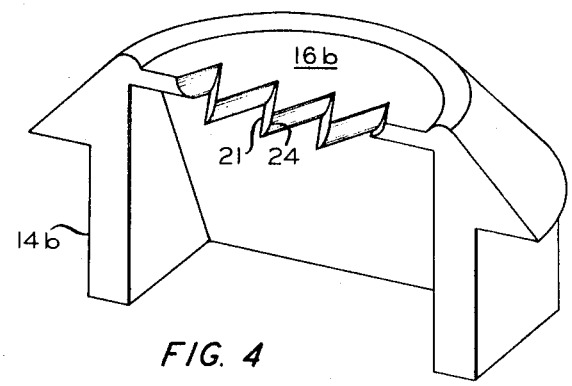
FIG. 4 is a perspective view of a single pinching and sealing jaw, enlarged to show the detail more clearly.

FIG. 4 is a detailed view of a pinching and severing jaw 14b having an upper surface 16b. Sharp edge 21 serves as a severing means to cut said parison. In embodiments such as are shown here and in FIGS. 2, 5, 7, and 8, where a tab or bead is formed, the severing means is spaced down from upper surface 16b about $\frac{1}{32}$ to $\frac{3}{32}$ inch to give a protuberant strip of about $\frac{1}{32}$ to $\frac{3}{32}$ inch.

In FIG. 5 there is shown the cooperation of pinching jaw 14b and matching pinching jaw 12b to pinch off a parison 22 along severing line 18b. Curved setback portions 24 and 26 define a recess which forms bead 28.

Figure 6:
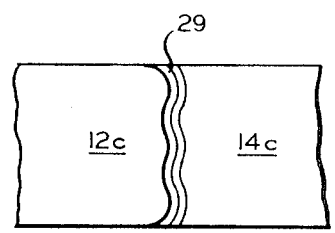
FIG. 6 is a plan view of pinching and sealing jaws having an alternate configuration.

FIG. 6 shows in plan view a pair of matching pinching and sealing jaws 12c and 14c. The leading edges 29 of these jaws have a configuration in the general shape of a sine wave.

FIG. 7 is a perspective view of the bottom 30 of a container 32 sealed with the pinching and severing jaws of FIGS. 1 and 2. A corrugated tab 34 having a saw tooth shape which is formed in recess 20 (see FIG. 2) extends downwardly a short distance from the bottom of the container. Generally the bottom of the container is slightly concave so that the slight projection of tab 34 will not interfere with the container sitting on a flat surface.

FIG. 8 is a cross-sectional view along section line 8—8 of FIG. 7. The line describing the inclined surface 35 of the periphery of the depending bottom wall is not shown so as to allow showing tab 34 more clearly.

FIG. 9 is a plan view of the bottom of a container blown from a parison severed by the severing means of FIG. 3. Corrugated line 36 is flush with bottom 30a of the container as can be seen from FIG. 10, and thus is both a severing and sealing line.

Figure 11:
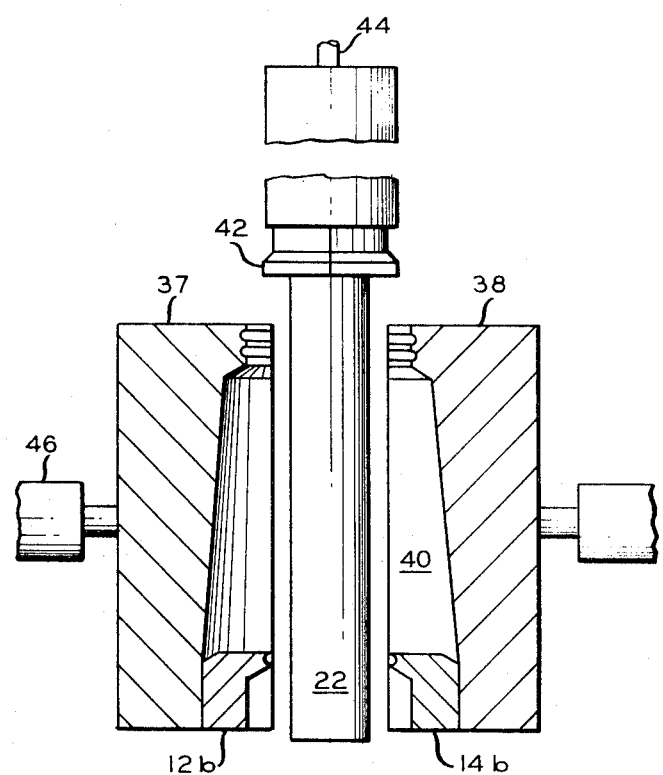
FIG. 11 is a cross-sectional view of two mold halves having pinching and sealing jaws, such as are shown in FIG. 4, integrally attached to the mold halves.

FIG. 11 shows an alternate embodiment of the invention wherein sealing jaws 12b and 14b are an integral part of mold halves 37 and 38 containing bottle forming cavity 40. This is to be distinguished from the other embodiments shown wherein the pinching and severing jaws can move independently of the cavity forming mold parts. Parison 22 is held by parison holding means 42. Air is introduced into the interior of the parison through line 44. Cylinders 46 supported by a frame (not shown) reciprocate mold halves 37 and 38 and thus serve as the means to move the sealing jaws into and out of engagement.

It is further to be noted that the severing means can be separate from the pinching and sealing means. In some instances, the severing means may form a severing line which is more in the nature of a score line so that the end of the parison below the severing line can be easily removed after the article has been formed.

EXAMPLE

Propylene homopolymer having a density of 0.905 (ASTM D 1505–63T), a melt index of 2 (ASTM D 1238–62T, Condition L), and a crystalline melting point of 340° F. was extruded into tubing having an internal diameter of 0.8 inch and a wall thickness of 0.15 inch. This tubing was cooled to room temperature and cut into five inch lengths. These five inch lengths of tubing were carefully heated to a temperature of 320–338° F. These parisons were divided into three groups. Group A was sealed with a sealing and severing device such as that shown in FIGS. 1 and 2 to give a bottom seal such as is shown in FIGS. 7 and 8. Group B was sealed with a pinching and severing means such as is shown in FIG. 6 to give a bottom configuration identical to that of FIGS. 7 and 8, except the tab had a configuration in the general shape of a sine wave rather than a zigzag configuration. The parisons of Group C were sealed with a pinching and severing means having a configuration similar to that shown in FIG. 2 in cross section, but without the corrugated configuration, that is, recess 20 extended straight to give a straight parting line, as opposed to a corrugated parting line. All other conditions were essentially identical, including the height of the tab formed which was about 1/16 inch. The bottles were filled liquid full with water and dropped from an eight foot height. The results were as follows:

|  | Percent failure | | |
| --- | --- | --- | --- |
|  | Group A (the invention) | Group B (the invention) | Group C (the prior art) |
| 1 drop | 5 | 5 | 40 |
| 25 drops | 10 | 10 | *100 |

*All failed before 25 drops.

While this invention has been described in detail for the purpose of illustration, it is not to be construed as limited thereby, but is intended to cover all changes and modifications within the spirit and scope thereof.

We claim:

1. In a method of forming an article wherein a tubular thermoplastic parison in the solid state at a temperature of 1 to 50° F. below the crystalline melting point of said thermoplastic material, is sealed off at one end preparatory to blow molding, the improvement comprising: sealing off said one end along a corrugated sealing line while said parison is at said temperature of 1 to 50° F. below said crystalline melting point.

2. A method according to claim 1 wherein said sealing line has a sawtooth configuration.

3. A method according to claim 1 wherein said sealing line has the general shape of a sine wave.

4. A method according to claim 1 wherein said parison is severed flush with a bottom wall of said container.

5. A method according to claim 1 wherein said parison is severed at a point spaced below a bottom wall of said container so as to leave a corrugated protuberant strip defining said sealing line.

6. A method of forming a biaxially oriented bottle comprising sealing off one end of an open ended tubular thermoplastic parison which has been reheated to orientation temperature preparatory to blow molding, said orientation temperature being below the melting point of said thermoplastic and such that strengthening occurs on stretching, said sealing off being done along a corrugated sealing line while said parison is at said orientation temperature.

References Cited

UNITED STATES PATENTS

| 3,278,666 | 10/1966 | Donald | 264—94X |
| 3,358,062 | 12/1967 | Lemelson | 264—96 |
| 2,613,489 | 10/1952 | Terry | 53—373 |
| 3,288,317 | 11/1966 | Wiley | 18—14(A)X |
| 3,353,327 | 11/1967 | Cutler et al. | 53—373X |

FOREIGN PATENTS

| 764,321 | 8/1967 | Canada | 264—94 |

ROBERT S. WHITE, Primary Examiner

T. J. CARVIS, Assistant Examiner

U.S. Cl. X.R.

18—5; 264—94

UNITED STATES PATENT OFFICE

CERTIFICATE OF CORRECTION

Patent No.   3,592,885          Robert R. Goins et al     Dated:   July 13, 1971

It is certified that error appears in the above-identified patent and that said Letters Patent are hereby corrected as shown below:

In the title on both sheets of the drawings and in column 1, "REAL" should read --- SEAL ---.

Signed and sealed this 7th day of March 1972.

(SEAL)
Attest:

EDWARD M. FLETCHER, JR.
Attesting Officer

ROBERT GOTTSCHALK
Commissioner of Patents